US011267136B2

(12) United States Patent
Cox et al.

(10) Patent No.: US 11,267,136 B2
(45) Date of Patent: Mar. 8, 2022

(54) SYSTEM FOR HANDLING FLEXIBLE MATERIALS

(71) Applicant: LOOP TECHNOLOGY LTD, Dorset (GB)

(72) Inventors: John Cox, Dorset (GB); Tim Garton, Dorset (GB); John Wright, Leicestershire (GB)

(73) Assignee: LOOP TECHNOLOGY LIMITED

( * ) Notice: Subject to any disclaimer, the term of this patent is extended or adjusted under 35 U.S.C. 154(b) by 721 days.

(21) Appl. No.: 15/771,650

(22) PCT Filed: Oct. 31, 2016

(86) PCT No.: PCT/IB2016/056560
§ 371 (c)(1),
(2) Date: Apr. 27, 2018

(87) PCT Pub. No.: WO2017/072741
PCT Pub. Date: May 4, 2017

(65) Prior Publication Data
US 2018/0326595 A1 Nov. 15, 2018

(30) Foreign Application Priority Data
Oct. 31, 2015 (GB) .................................. 1519284

(51) Int. Cl.
*B23P 15/04* (2006.01)
*B25J 15/00* (2006.01)

(52) U.S. Cl.
CPC ........... *B25J 15/0061* (2013.01); *B23P 15/04* (2013.01)

(58) Field of Classification Search
CPC ....... B23P 15/04; B23Q 1/035; B25B 11/005; B25B 11/0052; B25B 11/0616; B25B 11/0061

(Continued)

(56) References Cited

U.S. PATENT DOCUMENTS 1,110,409 A * 9/1914 Sutherland .............. B66C 1/025
294/65
4,527,783 A * 7/1985 Collora .................. B23Q 1/032
269/21

(Continued)

FOREIGN PATENT DOCUMENTS

DE        8813521 U1 * 3/1989 ............. B66C 1/025
DE   10 2013 208 778        11/2014

(Continued)

OTHER PUBLICATIONS

UK Combined Search and Examination Report, GB 1519284.2, dated Mar. 14, 2016.

(Continued)

*Primary Examiner* — Joseph J Hail
*Assistant Examiner* — Arman Milanian
(74) *Attorney, Agent, or Firm* — William H. Bollman

(57) ABSTRACT

A system (100) for handling sheets of flexible material comprises: a plurality of releasable connectors (20) supported on a main carrier (110). The releasable connectors (20) are individually addressable so that when actuated a connector lifts or releases a sheet of flexible material. One or more end adjustment means is provided to vary at least one of: the orientation and/or the location of the connectors (20), with respect to a surface defined in three dimensions, such that in use the sheet of flexible material is placed in a precise user selected position on the three dimensional surface without the material creasing or wrinkling. An advantage of the present invention is that previously actuators were able to orient grippers to be normal to the surface of a cylinder; whereas the provision of parallel, flexible strips enables active surfaces to be positioned normal to the surface of complex surface, such as that defined by a cone.

21 Claims, 5 Drawing Sheets

(58) Field of Classification Search
USPC .................................. 269/266, 188; 414/800
See application file for complete search history.

(56) References Cited

U.S. PATENT DOCUMENTS

| | | | | |
|---|---|---|---|---|
| 4,579,271 | A * | 4/1986 | Fujita | B23K 37/04 |
| | | | | 228/46 |
| 5,578,153 | A * | 11/1996 | Hill | B32B 17/10954 |
| | | | | 156/106 |
| 9,555,550 | B2 * | 1/2017 | Eisele | B25J 15/0616 |
| 9,651,084 | B1 * | 5/2017 | Livingston, Jr | F16B 47/00 |
| 9,849,597 | B2 * | 12/2017 | Mukou | B66C 1/0243 |
| 2005/0093219 | A1 | 5/2005 | Baumann | |
| 2006/0143890 | A1 * | 7/2006 | Linnemann | B25J 15/0616 |
| | | | | 29/33 R |
| 2006/0277733 | A1 * | 12/2006 | Boyl-Davis | B25B 11/007 |
| | | | | 29/26 B |
| 2014/0199153 | A1 * | 7/2014 | Reinhold | B65H 3/0816 |
| | | | | 414/800 |
| 2014/0237793 | A1 * | 8/2014 | Gamboa | B23Q 9/0042 |
| | | | | 29/426.2 |

FOREIGN PATENT DOCUMENTS

| | | | | |
|---|---|---|---|---|
| DE | 102014118908 A1 * | 6/2016 | ............. | B29C 70/38 |
| DE | 102015009177 A1 * | 1/2017 | ................ | B32B 1/00 |
| EP | 0429901 | 5/1991 | | |
| EP | 2756934 A1 * | 7/2014 | .......... | B25J 15/0616 |
| EP | 2952302 A2 * | 12/2015 | .......... | B25J 15/0052 |
| ES | 2258893 A1 * | 9/2006 | .......... | B25J 15/0052 |
| ES | 2354793 | 3/2011 | | |
| WO | WO2014/094903 | 6/2014 | | |
| WO | WO2014/199124 | 12/2014 | | |

OTHER PUBLICATIONS

PCT International Search Report and Written Opinion, PCT/IB2016/056560, dated Feb. 10, 2017.

* cited by examiner

SYSTEM FOR HANDLING FLEXIBLE MATERIALS

FIELD OF THE INVENTION

The present invention relates to a system for handling flexible materials. More particularly, but not exclusively, the invention relates to a system for handling thin or very thin sheets of flexible materials, such as for example carbon fibres, which are used for tensile reinforcement which are in excess of 10 m² in size.

BACKGROUND

During construction of an aerofoil, fuselage or an aircraft tail piece, large sheets of flexible materials often need to be transported and placed carefully and precisely without damaging them and importantly without introducing any twists or kinks. This process is often referred to as laying up of a sheet of material.

Handling large, fragile sheets made of flexible materials presents problems, particularly when it is important to orient the sheets in a specific direction in order to impart strength to an object the sheet is covering. A frequently encountered problem is that sheets have to be transported between locations and placed on structures which have complex shaped surfaces. For example, it is sometimes necessary to pick up a large flexible sheet, from a flat or even surface and set the sheet down on a complex surface, which may have convex and/or concave regions. One such complex surface is that which is present on a wind turbine blade, wing or other aerofoil.

The process of laying up has been carried out by using grippers which are movable on a deformable holding device by means of a supporting element. The holding device was able to be displaced alternately from a relaxed state, with low deformation resistance, into a braced state in which it replicated the complex surface.

It is important when laying up fibre sheets of material that they are laid in a specific manner. An example of a method of laying up fibre sheet material to manufacture wind turbine blades, is described in EP-A-2 732 153 (Vestas Wind Systems). The method known as a chordwise lay-up is used to lay up an oblong fibre sheet material which in their lateral direction are broader than a lateral unidirectional layer.

PRIOR ART

There are a number of systems for handling sheets of flexible material. European Patent Application EP-A1-0 429 901 (Krupp) discloses a manipulating device, particularly for handling objects made of flexible matter, comprising holding members movable on a variable shape bracket by means of a support member.

The variable shape bracket is transferred between a stiffened state and a relaxed state by the change of a physical quantity, such as temperature or pressure. In the relaxed state the bracket is limp and deforms to the shape of a surface upon which a sheet of flexible material is placed.

A problem associated with the system described in EP-A1-0 429 901 is that it is not possible to deform the bracket to the shape of a surface without bringing the bracket into contact with the surface. Therefore if a sheet of flexible material is positioned on the surface or being held by the system during this process, there is a risk that the material may be damaged by forces exerted between the surface and the bracket.

International Patent Application WO-A-2015092364 (Short Brothers PLC) discloses a positional adjustment system for an attractor comprising a positioning plate disposable adjacent to a surface of a mould. A drive is operative to move and/or reorient the positioning plate with respect to the mould. At least one positioner hangs from an opening in the plate and which is moveable independently from it. At least one attractor is connected to the at least one positioner and a joint is provided between the positioner and the positioning plate.

The apparatus may comprise a plurality of positioners and attractors and adjacent attractors may be connected together by connectors.

A problem associated with the system disclosed in WO-A-2015092364 is that each attractor must be manipulated independently. Therefore the apparatus is complicated, expensive and not easily scalable to handle larger sized sheets of material.

A further problem associated with the system disclosed in WO-A-2015092364 is that the orientation of an attractor can only be varied by rotating the positioner at the point where it is connected to the positioning plate. This can result in a substantial change in the location of the attractor and can make it difficult to orient the active faces of attractors such that they conform to a desired surface when placing material.

International Patent Application WO-A-2014094903 (Short Brother PLC) discloses a fabric handling system including a lay-up table, a mould and a fabric handling array adapted to transfer at least one fabric shape from the lay-up table to the mould. The fabric handling array includes a plurality of attractors in an array with alterable orientation with respect to the lay-up table and the mould. The attractors may be suspended from a frame and be displaceable vertically.

A problem associated with the system described by WO-A-2014094903 is that the system is limited to handling sheets of material in a sustainably horizontal manner. Additionally, the vertically suspended attractors are not rigidly held in position, this limits the precision with which the apparatus may handle and manipulate flexible material and increases the risk of the material being damaged during handling.

A further problem associated with this system is that the orientation of the attractors cannot be controlled easily. Therefore it is difficult to ensure the active surface of the attractor is orientated directly towards a desired surface.

It is difficult to ensure connectors in the systems disclosed in WO-A-2014094903 and WO-A-2014094903 conform to the same surface as the active faces of the attractors. Therefore when a curvature is present in the surface upon which a sheet of flexible material is to be placed, the distance between attractors and the surface varies. This can stretch material held by the attractors when convex curvature is induced or wrinkle the material when concave curvature is induced.

ES-A-20110318 (Loxin) discloses a support for machining a sheet of metal. The sheet in this instance is not flexible to the same extent that woven fabrics are. Other examples of systems are disclosed in U.S. Pat. No. 4,527,783 (Grumman Aerospace), US 2014/0199153 (Broetje-Automation GmbH) and WO-A-2014/199124 (University of Bristol).

None of the systems described in any of the aforementioned disclosures is able to lift and manipulate a sheet of flexible material or fabric, and controllably drape it onto confirm to a complex surface without creasing, crumpling or damaging it.

An object of the present invention is to provide a system for handling sheets of flexible material that allows the sheets of flexible material to be lifted, manipulated and placed with a high degree of precision while minimizing the risk of damage to the material.

Another aim of the system is to be able to handle large sheets of flexible material in a reliable, repeatable manner and to be modular and scalable for very large scale production.

SUMMARY OF THE INVENTION

According to a first aspect of the invention a system for handling a sheet of flexible material includes: a main carrier which comprises a plurality of parallel, flexible strips arranged in pairs; first and second braces connect parallel, flexible strips one to another at a plurality of locations so as to define a plurality of connector mounts that each support a releasable connector which selectively lifts or releases a sheet of flexible material; at least one end adjustment means is connected to a strip and imparts a tensile/compressive force on the strip; and at least one displacement means acts to displace at least one of a pair of parallel, flexible strips in a direction perpendicular to its longitudinal axis; the forces applied by the end adjustment means and the displacement means combine to provide a resultant force that causes bending along and twisting of at least one of the strips such that a polynomial curve is defined along the length of the at least one strip, thereby varying the orientation and/or the location of the mounts, so that active faces of the releasable connectors are presented parallel to a complex surface.

An advantage of the system is that it is able to impart displacement and a tilt to many small regions of a sheet in two planes, so that tessellating regions which are acted upon, adopt a complex overall form. An example is that previously actuators were only able to orient grippers to be normal to the surface of a cylinder; whereas the provision of parallel, flexible strips enables active surfaces to be positioned normal to the surface of complex surfaces, such as that defined by cones and saddle curves.

The system may be used to lift, handle, transport and manipulate sheets of flexible material such as: sheets of carbon fibre or glass fibre fabric or sheets of graphene. Ideally sheets of flexible material handled by the system are lifted off of and/or deposited upon user selected positions on a three dimensional surface, such as a lay-up table or a mould.

The strips are ideally formed from a strong flexible material such as carbon fibre. The end adjustment means selectively apply tension and/or compression on a first strip of a pair; and/or selectively apply tension and/or compression on a second strip in the pair. These forces, in combination with the perpendicular forces applied by the displacement means, alter the position, as well as the orientation, of connector mounts so that active faces of the releasable connectors are varied due to the flexible strips being selectively bent and twisted. End adjustment means are ideally provided at each end of each flexible strip.

In preferred embodiments a sheet of flexible material, which is attached to the releasable connectors, is held in the shape of a surface in three dimensions defined by the location and orientation of the releasable connectors. The variable orientations and/or locations of the releasable connectors therefore allow the system to releaseably hold a sheet of flexible material or fabric in the shape of a plurality of different surfaces defined in three dimensions. Therefore when the system lifts a sheet of flexible material off a surface, the locations and/or orientations of the releasable connectors may be varied such that the system holds the sheet of flexible material or fabric in the same shape or a user defined shape. In this way the system is able to lift the sheet of flexible material or fabric off a surface without deforming it in any way, thereby minimising the risk of the sheet becoming wrinkled, creased, torn or otherwise damaged.

Similarly the system is able to place the sheet of flexible material or fabric in a precise location onto a surface which may not be smooth or planar, without damaging the sheet of flexible material or fabric. The positions and/or orientations of the releasable connectors are varied such that the system holds the sheet of flexible material or fabric in a shape conforming to that of the surface upon which it is to be deposited. The system may then place the sheet onto the surface without having to release any portion of the sheet before it is in contact with the surface, this minimises the risk of the sheet becoming wrinkled, creased, torn or otherwise damaged.

In preferred embodiments a means is provided to vary the locations and/or orientations of the releasable connectors whilst a sheet of flexible material is being held so that it can be oriented into a specific shape or form, for example during transit from being picked up to being layed-up at a selected location.

Optionally secondary pairs of strips are connected in a perpendicular manner to the pairs of parallel, flexible strips to assist control the curvature of a complex surface along a second axis.

The positions and/or orientations of the releasable connectors, that in use attach to a sheet of material, may be varied by selective deactivation of one or more active faces so that some portions of the sheet are allowed to deform under the effect of gravity.

In preferred embodiments the main carrier is in the form of an elongate support, gantry or flexible planar surface. Ideally the means that varies the locations and/or orientation of the releasable connectors operates by deforming the main carrier to a surface in three dimensions defined by a user.

The elongate support, gantry or flexible planar surface which supports the connectors, may comprise a sheet or band or strut of a flexible material. The sheet of flexible material band or strut may consist of a plurality of narrow flexible strips. If the surface is made up of flexible strips the strips may be arranged in a square, rectangular, triangular or other grid form.

Optionally the flexible, parallel strips may not be interconnected by braces and are instead arranged to be independent of one other. In another alternative embodiment a flexible planar surface may comprise a stretchable sheet of flexible material attached to an underside of a plurality of the flexible strips.

Preferably the releasable connectors are supported upon the flexible, planar surface such that, prior to release of the sheet of flexible material, the active faces of the connectors lie in the same plane as the complex surface onto which the sheet of flexible material is to be placed. Therefore, when the surface, or a portion of the surface of the sheet of flexible material of material, is deformed or draped onto a concave or convex shape, the distance from the complex surface and active faces of each of the connectors is ideally constant. The system is thus capable of draping material not only onto simple curved surfaces (such as cylinders), but also onto objects with double curved surfaces, such as spherical surfaces or surfaces of oblate spheroids or prolate spheroids (rugby ball); as well as onto so called saddle curves which might include one or more combined concave and convex surfaces. Thus a sheet of flexible material, held by the releasable connectors, is not stretched as it is laid onto a surface, which might be caused by a convex shape; or creased or wrinkled which might otherwise be caused by a concave shape.

In further preferred embodiments, the means by which the orientation and/or position of the releasable connectors are varied includes at least one strip adjustment means. The strip adjustment means may move and/or deform one or more of the parallel, flexible strips upon which the releasable connectors are mounted. Therefore by moving or deforming the flexible strips the strip adjustment means varies the positions and or orientations of the releasable connectors, and by extension varies the three dimensional shape that a sheet of flexible material held by the releasable connectors assumes.

In further preferred embodiments a third adjustment means is attached to at least one end of a flexible strip; the third end adjustment means displaces the flexible strip in a third direction which is different to the first and second directions.

Strip adjustment means may move and/or deform individual strips independently of each other or they may move and/or deform the flexible strips as separate pairs.

Optionally a twist means is provided to impose a twist between adjacent strips of a pair so as to alter the angle between at least one of a pair of parallel, flexible strips and a line that is normal to a point on the surface. The twist means is attached to at least one end of a flexible strip to apply a torsional force to twist the flexible strip about its elongate axis. The end adjustment means may be adapted to apply the torsional force or a different actuator may be used to achieve this.

It is appreciated that end adjustment means are used to displace one or more flexible strips such the positions and/or orientations of active faces of the releasable connectors mounted upon the strip are varied in a precise and controllable manner, thereby precisely varying the three dimensional surface that a sheet of flexible material (held by the releasable connectors) is able to adopt.

The end adjustment means include one or more actuators, such as motors or solenoids which when actuated, may act directly or via cams and/or gears in order to displace the end of one or more flexible strips. Other manipulation means may be incorporated, for example, these include: electromagnetic manipulators, piezoelectric manipulators, hydraulic manipulators or pneumatic manipulators.

In preferred embodiments at least one of the end adjustment means sets and maintains at least one end of a flexible strip at a fixed angle with respect to a fixed point on a frame of the carrier or with respect to the three dimensional surface onto which the sheet of flexible material is to be placed. This allows the profile of the strip to define more complex shapes allowing greater control over the locations and/or orientation of the releasable connectors so that when actuated, the first and second displacement means displace the strip so that its profile defines a polynomial curve.

In further preferred embodiments the first and second displacement means are adapted to move lengthwise along the strip. The displacement means may consist of arms mounted upon the main carrier with apertures at the end that enclose one or more of the flexible strips. The apertures may be large enough to slide along at least a portion of the length of the strip and small enough such that any movement, of arms of a displacement means, in a direction substantially perpendicularly to the length of the strip, causes the strips to deflect. Arms are ideally motorized so that they can controllably slide along the flexible strip and controllably deflect the flexible strip.

Optionally movable supports are provided lengthwise along at least one strip, whereby strips pass through the apertures so that the location and/or orientation of the strips at the positions they pass through the apertures, is/are fixed thereby fixing the strips in these locations and orientations. Because the apertures define specific points in space, through which the flexible strips must pass, the flexible strips can be forced to adopt highly complex profiles defining higher order polynomial curves. Further embodiments of the system may comprise additional displacement means such that the profile of the strips may define still higher order polynomial curves.

In some embodiments the strip adjustment means may comprise actuators, such as piezo electric actuators, distributed along the length of one or more flexible strip. The actuators may be driven to extend retract or twist a local portion of the flexible strip, thereby inducing concave or convex curvature of the strip and varying the deflection and/or orientation and/or location of the releasable connectors, such that they are able to controllably lie in points on a complex surface.

In preferred embodiments of a system, comprising multiple pairs of parallel, flexible strips, braces may be adapted to connect adjacent strips at different locations along the length of each flexible strip, so that braces connecting adjacent pairs of parallel, flexible strips are offset one from another. Alternatively pairs of braces connecting adjacent parallel, flexible strips are arranged such that each pair of braces is spaced apart by substantially the same distance between adjacent parallel, flexible strips so as to define a regular array of connector mounts defined by pairs of parallel, flexible strips and pairs of braces.

Optionally braces are flexible so as to encourage an active face of a connector to adopt a specific orientation with respect to a surface which is particularly useful when laying up on a double curved surface or surfaces with highly complex curves.

In further preferred embodiments connectors are releasable with quick release catches so that they may be readily replaced.

In further preferred embodiments a means is provided to alter the angle between at least one of a pair of parallel, flexible strips and the normal to a point on the surface.

Ideally this is achieved by moving the braces lengthwise along the strips in a manner to accommodate twisting in at least one of the strips. Movement of braces along one of the strips imparts a force on the other strip. An alternative means may be provided to alter the angle between adjacent strips of at least one of a pair of parallel, flexible strips and the normal to a point on the surface, such that a polynomial curve is defined by the locus of points at the centre of each active face of releasable connectors.

In a particularly preferred embodiment of the system, the releasable connectors are individually addressable such that they are capable of being actuated independently of each other. This is useful when manipulating smaller sheets of flexible materials, which may be lifted and held by some of the releasable connectors supported the main carrier. A group of individually addressed releasable connectors are activated so only those activated are in contact with the portion of a flexible sheet (or a smaller sheet) so as to hold and lift the sheet. This feature may be deployed to reduce the load on the system; reduce energy consumption of the system; or reduce excess noise produced by actuators required to operate the releasable connectors.

In preferred embodiments of the invention, the releasable connectors comprise at least one of: a suction cup, a vacuum connector, a needle connector, a cryogenic connector, an electromagnetic connector and/or an electrostatic connector. Preferably the releasable connectors comprise active faces employing suction or vacuum grippers.

Different connectors may be more suitable for sheets of different materials, for example suction cups or vacuum connectors may be more suitable for sensitive or delicate materials that are easily damaged, such as thin sheets of carbon fibre. However, electromagnetic connectors may be more suitable for heavier sheets of magnetic material.

In preferred embodiments, the system comprises a modelling system that uses a geometrical model of a surface to determine locations and/or orientations necessary for the releasable connectors to define the surface.

In a further preferred embodiment, the modelling system is adapted to determine a series of polynomial fits that define the profile of a series of cross sections of the geometrical model of the surface. This might be achieved using a scanning beam of electromagnetic radiation and suitable sensors. One example is a scanning laser and suitable sensor or array of sensors.

Optionally the modelling system is used when the releasable connectors are mounted on parallel, flexible strips, adapted to be deformed such that their profiles define polynomial curves. The modelling system may be used to check the goodness of fit defined by a profile of parallel cross sections of a geometrical model of the surface that is adopted by adjacent pairs of parallel, flexible strips. Any discrepancy detected is fed back to selected strip adjustment means which are then used to deform the strips such that their profiles better match the intended polynomial curve which conforms to the surface of the geometrical model or surface to be covered.

Ideally the modelling system is able to model surfaces with cross sectional polynomial profiles of higher orders than are achievable by the deformable main carrier. Use of the system in conjunction with algorithms to compute errors is also able to find lower order polynomial curves that approximate to a surface. This allows the system to be used to define more complex surfaces.

In preferred embodiments, the system comprises a control system that varies the location and or orientation of the releasable connectors.

In further preferred embodiments the system comprises a modelling system and a control system that are integrated such that when a user provides a geometrical model of a desired surface, the modelling system determines the locations and or orientations of the releasable connectors necessary to define the surface and the control system is operable to vary the location and/or orientation of flexible strips such that active faces of the connectors define the surface.

In preferred embodiments of the system the main carrier is displaceable by means of at least one actuator which lifts and lowers the main carrier with respect to the surface. Ideally actuators comprise one or more vertical shafts along which a motorized main carrier is adapted to travel.

The actuator enables the system to be used to lift off a sheet of flexible material from a surface or to deposit a sheet onto a surface. For example the system may be used to lift a sheet of carbon fibre fabric off of a lay-up table or to deposit the sheet into a mould.

It is appreciated that the system is not restricted to handling sheets of material in a substantially horizontal manner and that sheets may be lifted and held in horizontal, vertical or inverted planes and placed against surfaces which are not wholly horizontal. This is because the main carrier is able to be rotated, lifted and tilted whilst the releasable connectors hold the sheet of flexible material in a precise and orientation without deforming the shape of the surface defined by the locations and orientations of the releasable connectors. The means for rotating, lifting and tilting the main carrier ideally comprises at least one robot arm. Ideally a gantry or a robot supported by a gantry is also provided.

In preferred embodiments the main carrier is supported by one or more robot arms. In further preferred embodiments the robot arm is adapted to move about at least three independent axes.

The at least one robot arm may be used to transport a sheet of flexible material held by the system from one location to another, such that the sheet may be transferred from an initial surface to a final surface. For example the system may lift off a sheet of flexible material from a lay-up table (the initial surface) and the robotic arm may then transport the system to a mould, aerofoil or fuselage (final surface) where the system deposits the sheet.

The robot arm moves all the releasable connectors simultaneously, thereby relocating the surface they define in three dimensions without deforming it. In use the system may be lowered onto a sheet of flexible material on a lay-up table after the positon and orientation of the releasable connectors are varied (for example, by use of the strip adjustment means) such that active faces of releasable connectors are positioned and orientated to hold a sheet in a shape identical to that of the lay-up table. The main carrier is then lowered until releasable connectors are able to lift the sheet of flexible material; selected active faces of the connectors, which may be in contact with the sheet, are then actuated such that they attach to the material.

The main carrier is then actuated in order to lift the material off the lay-up table and a robotic arm or other means is used to transfer the sheet to the final surface which may be a mould. Alternatively the final surface, such as a mould or wing, may be displaced towards the carrier, for example by way of actuators arranged to lift and/or rotate and/or tilt the surface.

In use the position and orientation of the releasable connecters are then varied such that they deform the sheet held by the connectors into the shape of the mould. The system then lowers the sheet of flexible material onto the mold and the connectors are actuated to release the sheet. The main carrier is then lifted off of the sheet, leaving it in a desired position on the mould.

According to a second embodiment of the invention there is provided an assembly line comprising a plurality of systems as described above.

The assembly line may comprise a plurality of systems such that a plurality of main carriers are supported by different synchronized transport means such as robots or gantries.

According to a third embodiment of the invention there is provided a method of using a system as described above wherein the locations and/or orientations of the releasable connectors are varied such that they define a surface at an initial location from which a sheet of flexible material is to be lifted, the main carrier is displaced with respect to the initial surface such that the connectors are brought into contact with the sheet; the connectors are actuated such that they are able to lift the sheet; and the main carrier is displaced to remove the sheet from the initial location, during transit the locations and/or orientations of the connectors are varied such that the sheet is deformed from its initial shape to the shape of a final surface in three dimensions substantially identical to that of a final surface upon which the sheet is to be placed; positioning the main carrier so that the sheet is placed in contact with the final surface, and releasing the connectors so as to place the sheet of flexible material onto the final surface.

Different techniques may be employed when placing a sheet onto the final surface; the sheet may be lowered directly onto the surface such that all points on a surface of the sheet come into contact with the final surface simultaneously. Alternatively a single portion of the sheet, such as a corner or edge, may be brought into contact with the final surface initially and the remainder of the sheet subsequently.

Actuators may be addressed so that they displace incrementally in small steps of the order of millimetres.

Preferred embodiments of the invention will now be described, with reference to the Figures, in which:

DETAILED DESCRIPTION OF THE FIGURES

Figure 1:
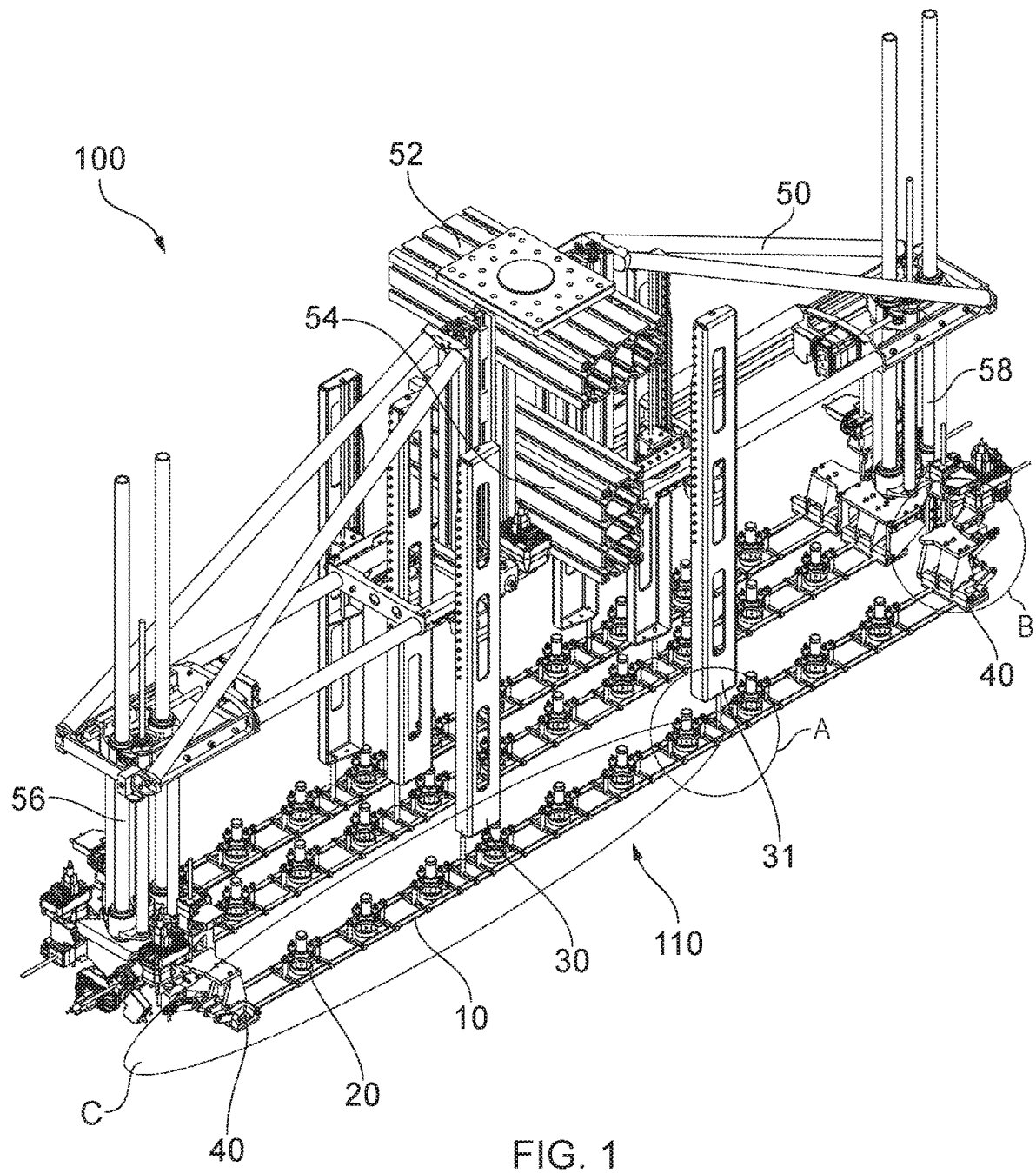
FIG. 1 is an isometric overview of an embodiment of a carrier.

Referring to the Figures generally there is shown an embodiment of the invention wherein the releasable connectors 20 are mounted upon 3 pairs of parallel, flexible strips 10 which are moved and/or deformed by strip adjustment means comprising end adjustment means 40 and a displacement means 30, 31.

FIG. 1 shows an isometric overview of one embodiment of a carrier 110 as part of a system 100. The carrier 110 comprises six sets of parallel, flexible strips 10 arranged in pairs supported on a frame 50. Each pair of parallel, flexible strips 10 is attached to one of a pair of first and second actuators 56, 58 which are located at each end of the parallel, flexible strips 10 and connected to the strips 10 by an end adjustment means 40. The actuators 56, 58 are mounted upon opposite ends of a frame 50. Six displacement means 30, 31 are also mounted upon the frame 50.

The frame 50 is constructed from a strong, lightweight material such as aluminium and is generally triangular in shape. In the centre of the frame 50 there is an upper mount 52 and a lower mount 54. Mounts 52 and 54 are adapted to allow the system 100 to be mounted on a robotic arm or a crane.

First and second actuators 56, 58 are mounted at opposite ends of the frame 50. The first displacement means 30 and the second displacement means 31 are each associated with a pair of parallel, flexible strips 10 which are also mounted on the frame 50. The displacement means 30, 31 are ideally located equidistant from the centre of the frame, approximately one third from each end of the frame 50. It is understood that additional displacement means may be provided and ideally these would also be located at an equal spacing one from another along the length of the frame 50.

In the embodiment shown there are three pairs of parallel, flexible strips 10 that are suspended below the frame 50, between the two actuators 56, 58. Each strip 10 is attached to an end actuator by an end adjustment means 40. The parallel, flexible strips 10 are arranged in pairs which are connected by braces 12 that are perpendicular to the strips 10. The braces 12 are distributed along the lengths of the strips 10 with a separation between the braces 12 that is equal to the separation between adjacent parallel, flexible strips 10 in each pair, such that the braces 12 and the strips 10 define a series of squares along the length of the pair of parallel, flexible strips 10.

Each pair of braces 12 has a releasable connector 20 mounted between them by means of a connector mount 14, which is mounted between the braces 12. As the interspacing of braces, along the length of the strips is equal, it is apparent that a releasable connector 20 is mounted effectively in square spaces defined by alternate squares along the length of each pair of parallel, flexible strips 10.

Therefore each pair of parallel, flexible strips 10 has ten releasable connectors 20 mounted between them. Three releasable connectors 20 are mounted between each displacement means 30 and 31 and each end adjustment means 40 and four releasable connectors 20 are mounted between the first displacement means 30 and the second displacement means 31.

Flexible strips 10 are constructed from a strong and flexible material, such as carbon fibre. This material accommodates repeated bending and twisting, so ensuring the strips do not fail. The flexibility and durability of the material also ensures that strips may be adjusted by repeated bending and twisting forces, that are imposed by the end adjustment means 40 and the displacement means 30, 31. This selective bending moves and/or deforms the strips 10 so that their profiles can be shaped to define second, third, fourth or fifth order polynomial curves along their axes.

As each pair of parallel, flexible strips 10 may be configured to define a different polynomial curve, for example corresponding to a different cross section of a surface in three dimensions, it is also understood that, when pairs of parallel, flexible strips are positioned adjacent one another to define an array, a complex surface, defined perpendicular to the axes of the strips 10 may also be defined. Therefore the strip adjustment means may adjust the parallel pairs of parallel, flexible strips 10 such that they can define a plurality of different complex surfaces in three dimensions.

The releasable connectors 20 are suction connectors that utilise a Venturi effect to maximise their attractive force. An airline 26 connects releasable connectors 20 to a pump (not shown) and causes air to be sucked (or blown) through a connector 20. When a valve (not shown) is actuated by a remote controller, operating under control of software, an active face 24 of the releasable connector 20 is activated and is able to grab and hold a sheet of material with a desired force which is dependent upon the speed of airflow passing through the connector. Once air flows through the connector out via exhaust 22, the active face 24 of the connector acts in a similar manner as a pneumatic sucker and draws and holds the sheet of flexible material.

Scanning or modelling of the surface may be performed using an imaging means, such as a laser. This may be used to obtain data relating to the shape of the surface or data may be obtained from a drawing or a source of computer aided design (CAD) data, such as is used to design or form the surface. Suitable sensors (not shown) are ideally provided which enable signals to be fed back relating to the position, location and orientation of key components, such as the position and orientation of releasable connectors 20, of the system in order to act as an index or start position.

The releasable connectors 20 are rigidly connected to braces 12 such that their active faces 24 are parallel to the surface defined by polynomial curves of the strips 10. The first and second actuators 56, 58 each comprise a pair of vertical shafts attached to three end adjustment means 40 at their lower end, the upper ends of the shafts pass through apertures mounted at the ends of the frame 50 and are adapted to travel through the apertures such that the distance between the frame and the main carrier may be adjusted.

Figure 2:
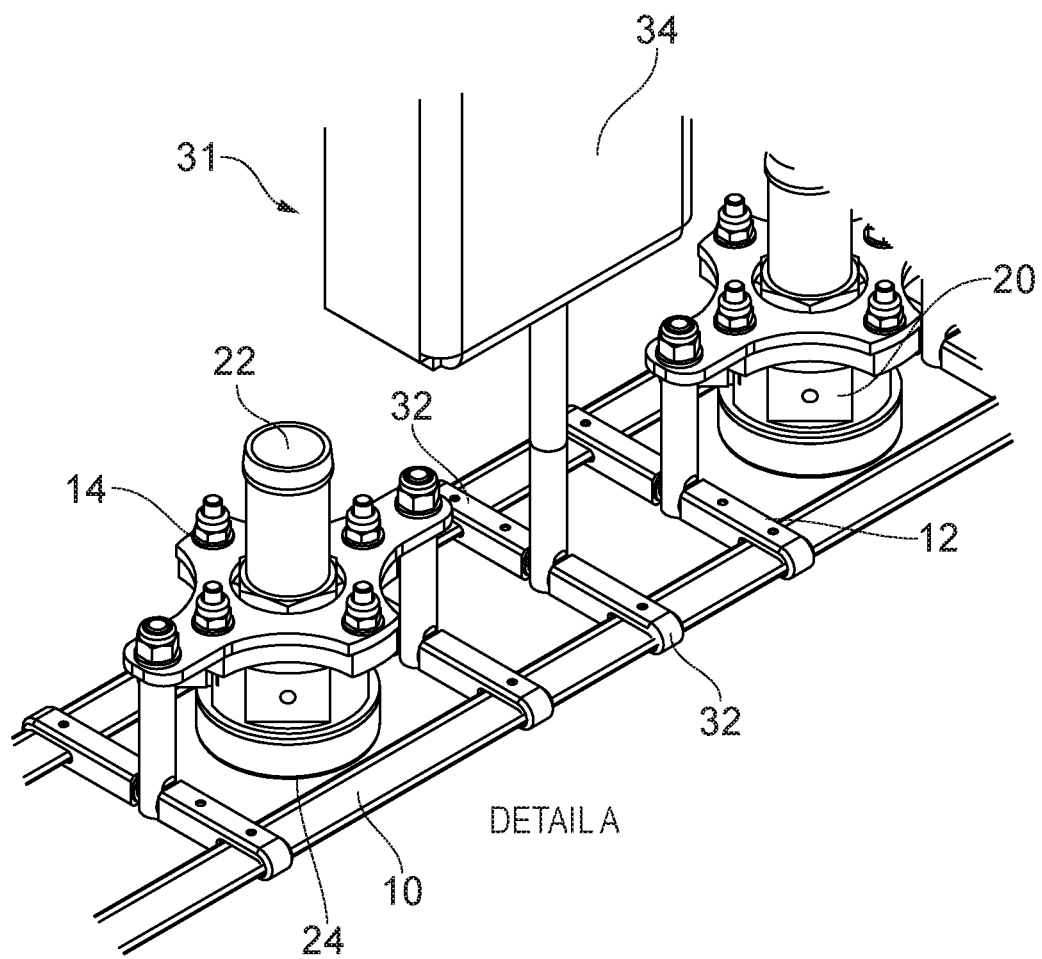
FIG. 2 is a detailed view of a displacement means and releasable connectors mounted on a pair of parallel strips.

Referring to FIG. 2, which shows a detailed isometric view of the section of a pair of parallel, flexible strips 10, where a second displacement means 31 is located. The displacement means 31 comprises an arm 34 the end of which is connected to a pair of parallel, flexible strips 10 by a pair of apertures 32. Apertures are suitably dimensioned such that the strips 10 may slide freely through them. The width of each aperture permits a small amount of vertical movement which may be manifested as twist. The displacement means 31 is capable of movement along the length of the strips 10 between pairs of braces 12 that define a mount 14 and releasable connection means 20.

The arm 34 of the displacement means 31 is adapted to have an adjustable length such that it can displace the section of the pair of parallel, flexible strips that is attached to it, in the direction parallel to the length of the arm such that the profile of the pair of parallel, flexible strips defines a polynomial curve. The length of the arm 34 may be adapted to change when the first and second actuators 56, 58 are used to adjust the separation between the main carrier and the frame, such that the movement of the end adjustment means 40, attached to the end of the actuators 56, 58, does not deform the polynomial curve defined by the strips 10.

Figure 3:
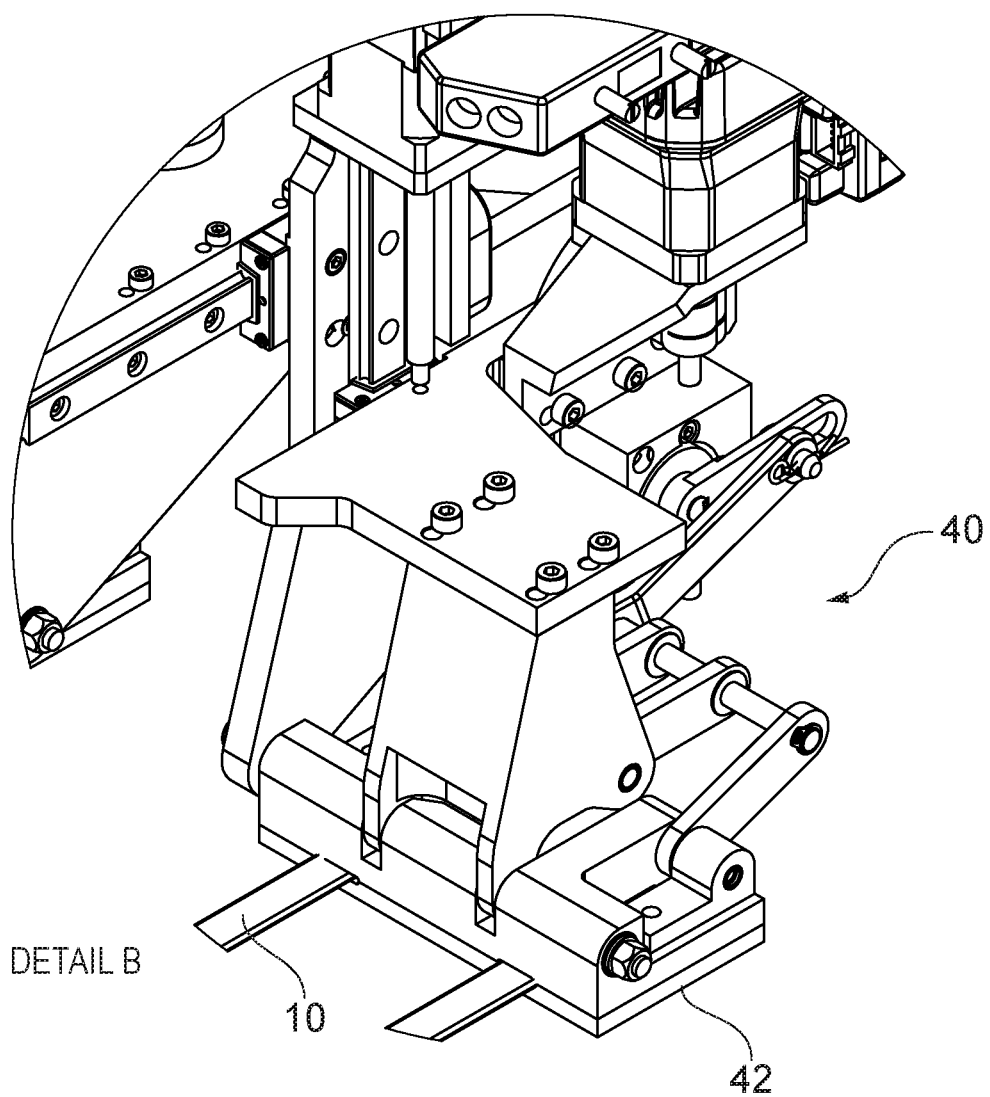
FIG. 3 is a detailed view showing connection between two flexible strips and an end adjustment means.

FIG. 3 shows a detailed isometric view of the connection between a pair of parallel, flexible strips 10 and an end adjustment means 40. Each pair of parallel, flexible strips 10 is attached to a rigid fixture 42 such that the ends of the strips 10 remain parallel to the rigid fixture 42. Therefore by varying the location and angle of the rigid fixture 42 with respect to the rest of the system, the end adjustment means 40 can vary the position and angle of the ends of the strips 10.

Figure 4:
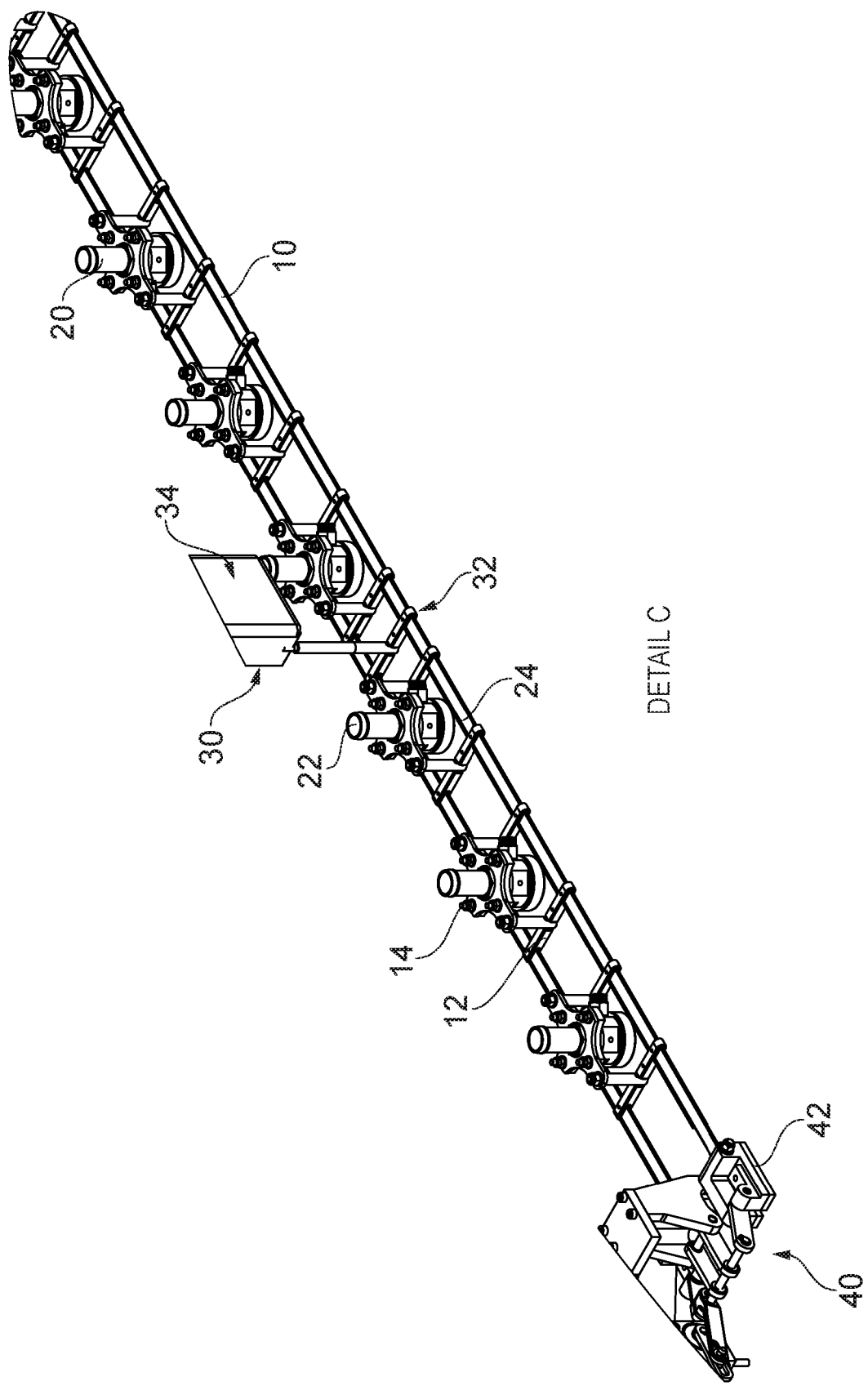
FIG. 4 is a detailed overall view of a pair of parallel, flexible strips showing an end attachment means and a displacement means.

Each end adjustment means 40 comprises a series of interconnected end adjustment means 40 which control the orientation and location of a rigid fixture 42. FIG. 4 shows an isometric view of a length of a pair of parallel, flexible strips 10, showing the attachment of the end adjustment means 40 and the first displacement means 30.

Figure 5:
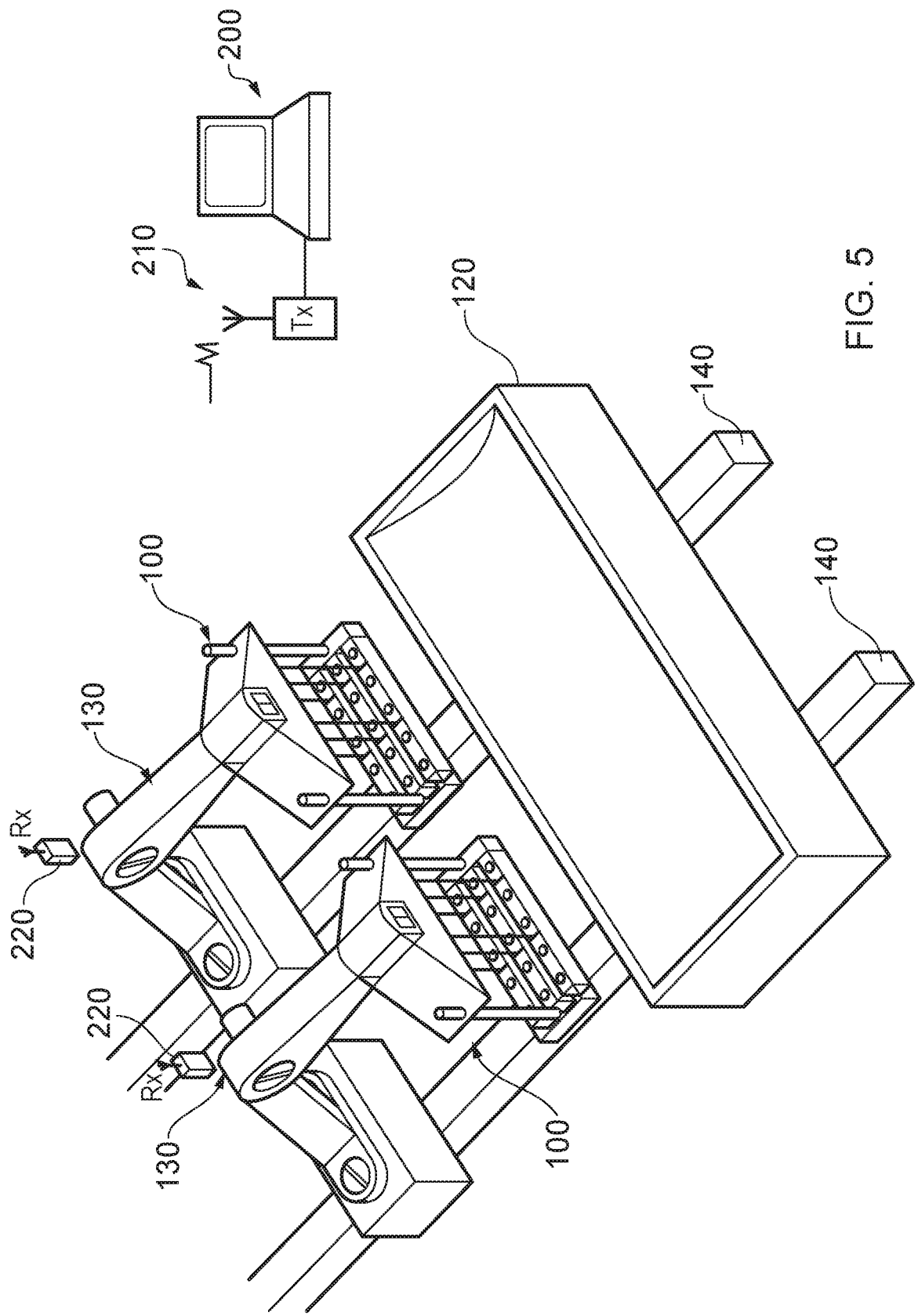
FIG. 5 is an overall diagrammatical view of a system included in a production line arranged to manipulate very large sheets of flexible material.

FIG. 5 shows an overall view of a production line comprising multiple systems 100 which are made up of pairs of robots 130 and 130. Each system 100 in the production line is controlled by a main computer 200 which oversees and manages the lifting and handling functions of the sheet of flexible material onto surface 120, as well as the displacement of pairs of robots 130 and 130 along tracks 140.

Communication between the computer 200 and the robots 130 is by way of an RF system comprising transmitter 210 and receivers 220. Optionally a series of hardwire modules (not shown) may be arranged end to end to form a relatively long thin data carrier. Alternatively optical fibres may be used to carry data to and from each system 100. For example for handling fabric a carrier 110 typically 20 m long and around 1.5 m wide is suitable. The carrier 110 has approximately 140 releasable connectors 20 lengthwise and around 10 releasable connectors 20 disposed across its width.

It will be appreciated by those skilled in the art that the invention has been described by way of example only, and that a variety of alternative approaches may be adopted without departing from the scope of the invention, as defined by the appended claims. For example the system may be used to overlay sheets of material on a domed structure, such as a pressure vessel or an autoclave machine which is liable to expand and so resist hoop stresses in the pressure vessel.

The invention claimed is:

1. A system (100) for handling a sheet of flexible material comprising:
   a main carrier (110) which comprises a plurality of parallel, flexible strips (10) arranged in pairs;
   first and second braces (12) connect a pair of the plurality of parallel, flexible strips (10) one to another at a plurality of locations so as to define a plurality of connector mounts (14) that each support a releasable connector (20) which selectively lifts or releases a sheet of flexible material; at least one end adjustment means (40) is connected to a first end of the pair of parallel, flexible strips (10) and imparts a tensile/compressive force on the pair of parallel, flexible strips (10); and
   at least one displacement means (30) acts to displace at least one of the pair of parallel, flexible strips (10) in a direction perpendicular to a longitudinal axis of the pair of parallel, flexible strips;
   wherein the tensile/compressive force applied by the at least one end adjustment means (40) and the displacement by the at least one displacement means (30) combine to provide a resultant force that causes bending along and twisting of the pair of parallel, flexible strips (10) such that a polynomial curve is defined along a length of the pair of parallel, flexible strips (10), thereby varying an orientation and/or a location of the plurality of connector mounts (14), so that active faces (24) of the releasable connectors (20) are presented parallel to a complex surface; and
   the at least one end adjustment means (40) is adapted to apply a torsional force to the pair of parallel, flexible strips (10).

2. The system according to claim 1 further comprising:
   means is provided to impose a twist on the pair of parallel, flexible strips (10) so as to alter an angle defined between a line on a surface of the at least one pair of parallel, flexible strips (10) and a line that is normal to a point on the complex surface.

3. The system according to claim 1 further comprising:
   a secondary pair of flexible strips connected in a perpendicular manner to the pair of parallel, flexible strips (10) to enable control of curvature along a second axis defined by the secondary pair of flexible strips.

4. The system according to claim 3, further comprising:
   an actuator provided to vary a position and/or location of the secondary pair of flexible strips.

5. The system according to claim 1 further comprising:
   second end adjustment means attached to a second end of the pair of parallel, flexible strips (10), the second end adjustment means displacing the pair of parallel, flexible strips (10) in a second direction which is different to a first direction in which the first end adjustment means (40) displaces the pair of parallel, flexible strips (10).

6. The system according to claim 5 further comprising:
   third end adjustment means attached to the first adjustment means, the third end adjustment means displacing the first end adjustment means in a third direction which is a different direction to the first and second directions.

7. The system according to claim 1 wherein the at least one displacement means (30) is adapted to move in a direction corresponding to lengthwise along the pair of parallel, flexible strips.

8. The system according to claim 7 further comprising: control means (200) to adjust the at least one displacement means (30) so as to displace incrementally and/or to deform incrementally the pair of parallel, flexible strips (10).

9. The system according to claim 1 further comprising: the first and second braces (12) connecting the pair of parallel, flexible strips (10) are adjustable lengthwise along the pair of parallel, flexible strips (10).

10. The system according to claim 1 wherein each of the first and second braces (12) is spaced apart by substantially a same distance as is between the pair of parallel, flexible strips (10) so as to define a square mesh form.

11. The system according to claim 1 wherein the releasable connectors (20) are individually addressable such that they are capable of independent actuation.

12. The system according to claim 1 further comprising: control means (200) operative to adjust the pair of parallel, flexible strips (10) independent from another of the plurality of pairs of parallel, flexible strips (10).

13. The system according to claim 1 wherein the releasable connectors (20) comprise at least one of:
suction cups,
vacuum connectors,
needle connectors,
cryogenic connectors,
electromagnetic connectors, and/or
electrostatic connectors.

14. The system according to claim 1 wherein the main carrier (110) is displaceable by means of at least one actuator which lifts and lowers the main carrier.

15. The system according to claim 1 wherein the main carrier (110) is supported by a gantry or robot (130) on a gantry or robot (130) arm.

16. The system according to claim 15 wherein the robot (130) arm is adapted to move about at least two independent axes.

17. The system according to claim 1 wherein a series of polynomial fits define a profile of a series of parallel cross sections of the complex surface.

18. The system according to claim 1 further comprises: a control system (200) that is operative to control an amount of force applied by each of the releasable connectors (20).

19. The system according to claim 1 wherein the locations and/or orientations of the releasable connectors (20) define the complex surface by setting the location and/or orientation of the flexible strips (10) such that the releasable connectors (20) are configured to define the complex surface.

20. The system according to claim 1 wherein the control system (200) communicates via a wireless communication system (210, 220).

21. A system (100) for handling a sheet of flexible material, the system comprising:
a plurality of releasable connectors (20) supported on a plurality of pairs of parallel, flexible strips (10) supported on a main carrier (110), the releasable connectors (20) having active faces (24) which are operative to lift or to release the sheet of flexible material for placement in a user selected position on a complex surface that is defined in three dimensions;
means to vary an orientation and/or location of the plurality of releasable connectors (20), with respect to the complex surface; and
a control system to actuate the releasable connectors (20) to hold the sheet of flexible material for lifting, the control system being operative to vary the orientation and/or location of the plurality of releasable connectors (20), by moving and/or actuating at least one of a plurality of strip adjustment means, each of the plurality of strip adjustment means comprising:
end adjustment means (40),
first (30) displacement means, and
second (31) displacement means, wherein
the first displacement means and the second displacement means are located intermediate of ends of a pair among the plurality of pairs of parallel, flexible strips (10);
actuation of at least one of the first displacement means (30) and the second displacement means (31) causes the pair of parallel, flexible strips (10) to be displaced, and flexed, thereby changing a profile thereof to define a polynomial curve whose profile matches a polynomial at a surface cross section;
adjacent pairs of the plurality of pairs of parallel, flexible strips (10) are displaced, and flexed and twisted by their respective end adjustment means, thereby causing active faces (24) to be oriented to deform the sheet of flexible material and to hold the sheet of flexible material in a shape corresponding to the complex surface; and
the control system is further operative to place the sheet onto the complex surface.

* * * * *